United States Patent
Götzinger et al.

(10) Patent No.: US 6,679,931 B1
(45) Date of Patent: Jan. 20, 2004

(54) METHOD FOR RECOVERING METALLIC CHROMIUM FROM SLAG CONTAINING CHROMIUM OXIDE

(75) Inventors: Karl Götzinger, Repelen (DE); Jan Reichel, Düsseldorf (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 10/019,207

(22) PCT Filed: Jun. 23, 2000

(86) PCT No.: PCT/DE00/02030

§ 371 (c)(1),
(2), (4) Date: Apr. 9, 2002

(87) PCT Pub. No.: WO00/79014

PCT Pub. Date: Dec. 28, 2000

(30) Foreign Application Priority Data

Jun. 23, 1999 (DE) .......................... 199 29 551

(51) Int. Cl.[7] .............................. C22B 34/32
(52) U.S. Cl. ........................ 75/10.35; 75/623
(58) Field of Search ................ 75/10.35, 623

(56) References Cited

U.S. PATENT DOCUMENTS 3,012,875 A * 12/1961 Senior ..................... 75/10.42
5,882,375 A * 3/1999 Edlinger et al. .......... 75/10.35
6,077,324 A * 6/2000 Fritz ....................... 75/10.12

FOREIGN PATENT DOCUMENTS

JP    A-51 028 502    * 3/1976

* cited by examiner

*Primary Examiner*—Melvyn Andrews
(74) *Attorney, Agent, or Firm*—Cohen, Pontani, Lieberman & Pavane

(57) ABSTRACT

A method for recovering metallic chromium from slags which contain chromium oxide from converter processes, such as AOD, MRP, AOD-L, MRP-L, CLU, ASM, Conarc stainless steel or vacuum processes, such as VOD, SS-VOD, RH, RH with lanze, includes drawing off the slag which is produced at the end of a blowing or treatment operation in a converter or a vacuum installation in unreduced form. The slag is charged into an electric furnace, which is also charged with a standard charge of scrap and, if appropriate, dust residues. Carbon and, if appropriate, silicon are additionally added to the electric furnace.

4 Claims, 1 Drawing Sheet

METHOD FOR RECOVERING METALLIC CHROMIUM FROM SLAG CONTAINING CHROMIUM OXIDE

PRIORITY CLAIM

This is a U.S. national stage of application No. PCT/DE00/02030, filed on Jun. 23, 2000. Priority is claimed on that application and on the following application(s):

Country: Germany, application Ser. No. 199 29 551.4, Filed: Jun. 23, 1999.

BACKGROUND OF THE INVENTION

The invention relates to a method for recovering metallic chromium from slags which contain chromium oxide.

DESCRIPTION OF THE PRIOR ART

In the conventional converter processes, such as the AOD, MRP, AOD-L, MRP-L, CLU, ASM, Conarc stainless steel or vacuum processes, such as VOD, SS-VOD, RH, RH with lanze, the basic decarburization reaction is carried out in a multiple substance system, the reduction of the chromium oxide using the carbon representing the basic mechanism.

After the primary oxidation of the chromium, which occurs in a high concentration in stainless steels, the carbon which is dissolved in the melt causes the chromium to be reduced at the bubbling surface and in what is known as the impingement area. The product of the reduction, namely the metallic chromium, is returned to the melt, and the carbon monoxide, after diffusion into the bubbles, is discharged into the gas atmosphere above the melt.

The chemical sequence of reactions is as follows:

$$\{O_2\}=2[O] \text{Dissociation} \quad (1)$$

$$[C]+[O]=\{CO\} \text{Direct decarburization} \quad (2)$$

$$2[Cr]+3[O]=(Cr_2O_3) \text{Chromium oxidation} \quad (3)$$

The reactions proceed under the following thermodynamic equilibrium $$K(T) = \frac{a_{Cr}^2 p_{CO}^3}{a_C^3 a_{Cr_2O_3}} \quad (4)$$

where $$\log K(T) = \frac{40536}{T} + 25.63 + p \quad (5)$$

where p=a parameter.

On account of the incomplete reduction of chromium during the decarburization, a partial quantity of the chromium oxide passes into the slag in the form of various spinels. The reduction effect becomes increasingly weak as the decarburization progresses, since the amount of the reducing element carbon decreases over the course of time. The economic viability of the process is based on recovering a chromium which is-bonded in this way. For this purpose, the reduction of the slag using high-affinity silicon in the form of FeSi is normally carried out at the end of the decarburization and of the oxygen blowing operation.

SUMMARY OF THE INVENTION

An object of the present invention is to provide a more simple and therefore more economical method for recovering metallic chromium from slags.

This object is achieved by tapping, i.e., drawing off, the slag which is produced at the end of a blowing or treatment operation in a converter or a vacuum installation in unreduced form.

This slag is then charged into an electric furnace, which is also charged with a standard charge of scrap and, if appropriate, dust residues.

Carbon and, if appropriate, silicon are additionally added.

During the melting process, the chromium oxide contained in the added slag is directly reduced to metallic chromium by the carbon and the silicon.

The conventional slag reduction step is omitted in the method according to the present invention. The slag, which is highly saturated with chromium oxide and maganese iron oxide and is present, for example, after an oxygen blowing operation, is removed from the metal, i.e., is tapped or drawn off from the ladle, in unreduced form and is charged into the upstream electric furnace. The slag is directly reduced by an addition of carbon and silicon from the scrap which is usually present in the electric furnace, if appropriate together with dust residues. In this way, the chromium oxide is reduced in the electric furnace instead of in one of the downstream installations, and the metallic chromium is thereby recovered.

The reduction reaction proceeds in accordance with the following equation:

$$2(Cr_2O_3)+3[Si]=4[Cr]+3(SiO_2) \quad (6)$$

In the electric furnace, direct reduction of the chromium oxide by means of the carbon and defined quantities of the silicon takes place under the atmospheric conditions, this reaction proceeding as follows:

$$(Cr_2O_3)+3[C]=2[Cr]+3\{CO\} \quad (7)$$

or with silicon $$2(Cr_2O_3)+3[Si]=4[Cr]+3(SiO_2) \quad (8)$$

The flow of the slag back into the electric furnace can take place immediately after each treatment or as a cumulative quantity from a number of different treatments.

Depending on the overall technology, this operation can be optimized in terms of cost and energy. It is of no importance for the method whether the slag is in a solid, liquid or intermediate state. This only affects the melting time required in the electric furnace.

Overall, this procedure results in the following economic and technological advantages:

- shortening of the overall treatment time of the melt 15–20 min, depending on the type of technology
- reduction in the consumption of FeSi
- reduction in the consumption of slag-forming agents high yields of metal
- increased service life of the refractory material
- increased service life of the nozzles and plugs
- improved energy balance of the converter or the vacuum installation
- improved purity of the metal
- elimination or considerable reduction of protective slag zones in converters and ladles

BRIEF DESCRIPTION OF THE DRAWINGS

In the drawings, wherein like reference characters denote similar elements through the several views.

DETAILED DESCRIPTION OF THE PREFERRED EMBODIMENTS

Figure 1:
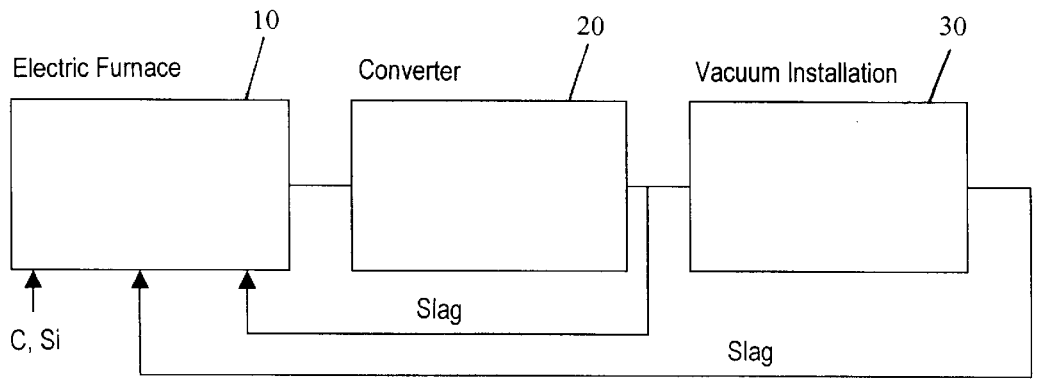
FIG. 1 is a schematic diagram depicting a three-stage method according to the present invention.

FIG. 1 shows a portion of an electric steelmaking system including an electric furnace 10, a converter 20, and a vacuum installation 30. Slag is tapped, i.e., drawn off, from both the converter 20 and the vacuum installation 30 in unreduced form and charged into the electric furnace 10, which also contains a charge of scrap and/or dust residues. Carbon is added to the electric furnace 10 with the slag and scrap. Silicon may optionally be added with the carbon. During a melting process in the electric furnace 10, chromium oxide contained in the slag is reduced to metallic chromium by the carbon and the optional silicon.

Figure 2:
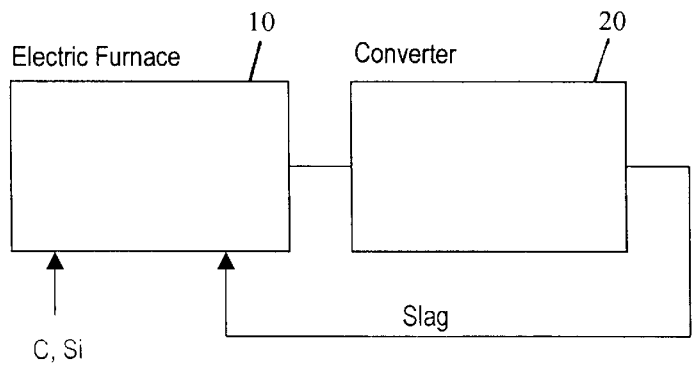
FIG. 2 is a schematic diagram depicting a two-stage method according to the present invention.
Figure 3:
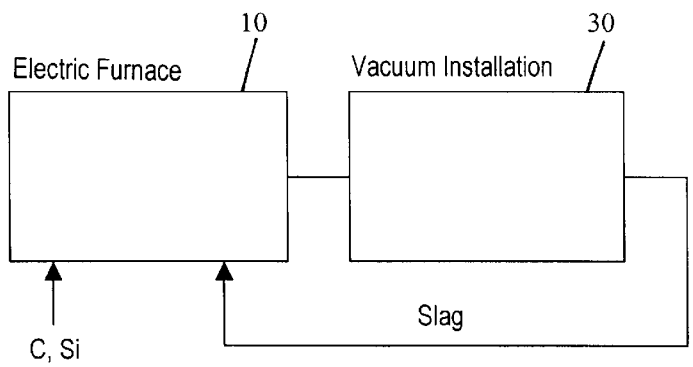
FIG. 3 is a schematic diagram depicting another two-stage method according to the present invention.

FIG. 2 shows an embodiment in which only slag from the converter 20 is added to the electric furnace 10 and FIG. 3 shows and embodiment in which only slag from the vacuum installation 30 is added to the electric furnace 10.

What is claimed is:

1. A method for recovering metallic chromium from a slag containing chromium oxide in a steelmaking system including an electric furnace and at least one of a converter and a vacuum device, the slag being produced by one of a blowing and treatment operation in the at least one of the converter and the vacuum device, said method comprising:

(a) performing a steelmaking process including forming molten steel in the electric arc furnace, transferring the molten steel to that at least one of a converter and a vacuum device, and performing at least one of a blowing and treatment operation in the at least one of a converter and a vacuum device which forms a slag containing chromium oxide;

(b) drawing off the slag from the at least one of the converter and the vacuum device of the steelmaking system after the one of a blowing and treatment operation;

(c) charging the drawn off slag into the electric furnace of the steelmaking system, wherein the electric furnace further includes a charge of scrap;

(d) adding carbon to the drawn off slag and the charge of scrap in the electric furnace; and (e) melting the drawn off slag and scrap in the electric furnace with the carbon so that the chromium oxide is reduced to metallic chromium by the carbon.

2. The method of claim 1, wherein the steelmaking system comprises a converter and a vacuum device and said step (b) comprises drawing off the slag from both the converter and the vacuum device.

3. The method of claim 1, wherein said electric furnace further includes dust residues in said step (c) so that the drawn off slag is added to the charge of scrap and the dust residues.

4. The method of claim 1, wherein said step (d) further comprises adding silicon to the drawn off slag and the charge of scrap and wherein the chromium oxide is reduced to metallic chromium by the carbon and silicon in said step (e).

* * * * *